(12) United States Patent
Murphy et al.

(10) Patent No.: US 12,488,663 B2
(45) Date of Patent: Dec. 2, 2025

(54) SECURITY MONITORING OF AN ASSET USING DISTRIBUTED ACOUSTIC SENSING WITH SELECTED GAUGE LENGTHS

(71) Applicant: Network Integrity Systems, Inc., Hickory, NC (US)

(72) Inventors: Cary R Murphy, Hickory, NC (US); Mark K. Bridges, Hickory, NC (US); Dave E. Cunningham, Conover, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 204 days.

(21) Appl. No.: 18/457,739

(22) Filed: Aug. 29, 2023

(65) Prior Publication Data
US 2025/0078635 A1 Mar. 6, 2025

(51) Int. Cl.
*G08B 13/12* (2006.01)

(52) U.S. Cl.
CPC .................. *G08B 13/124* (2013.01)

(58) Field of Classification Search
CPC ..................................... G08B 13/124
USPC .......................................... 340/555
See application file for complete search history.

(56) References Cited

U.S. PATENT DOCUMENTS

2024/0385343 A1* 11/2024 Schaeffer ............... G01V 1/288
2024/0405890 A1* 12/2024 Kohno ................... H04B 13/02

* cited by examiner

*Primary Examiner* — Kam Wan Ma
(74) *Attorney, Agent, or Firm* — Adrian David Battison; Ade & Company Inc.; Kyle R. Satterthwaite

(57) ABSTRACT

An asset such as a data transmission system, a perimeter security system, an oil well or a pipe line is monitored for events which are potentially damaging or threatening to the asset by installing an optical fiber continuously through the asset. The asset has many different zones of different physical condition, environment and/or of different risk factors which are expected therefore to generate different responses to events. The fiber is monitored using a distributed acoustic sensing (DAS) interrogator by effecting an analysis to determine the presence of an event in one or more of the zones The analysis includes applying different gauge length parameters to received data signals from the different zones at the same time.

22 Claims, 2 Drawing Sheets

SECURITY MONITORING OF AN ASSET USING DISTRIBUTED ACOUSTIC SENSING WITH SELECTED GAUGE LENGTHS

This invention relates to a method for monitoring security of an asset for events which are potentially damaging or threatening to the asset where an optical fiber is installed continuously through the asset to be monitored and the asset having at least two different zones of different physical condition, environment and/or of different risk factors where the optical fiber passes through said different zones to define different portions of the optical fiber each portion associated with a respective one of the zones. The system uses a Distributed Acoustic Sensing (DAS) system for analyzing responses from the optical fiber.

BACKGROUND OF THE INVENTION

Distributed Acoustic Sensing (DAS) systems employ an optical fiber together with an interrogator. These sensing systems may rely on detecting phase changes in backscattered light signals to determine changes in strain caused by the strain sources along the length of the optical fiber. To measure the phase changes, measurements of light signals from two different points along the optical fiber are taken to determine the total amount of strain over that distance. The distance between these two points is referred to as the gauge length and is fixed for each acquisition period. The gauge length is one of the significant parameters for the DAS systems having a direct impact on ensuing sensitivity, signal-to-noise-ratio (SNR), and spatial resolution of detected DAS data signals.

DAS monitoring of optical fibers applied along or to an asset can be used in many different locations and technologies including but not limited to oil wells, pipe lines, perimeter security such as borders, data transmission security and in monitoring seismic activity. Typical applications include continuous monitoring of pipelines for unwanted interference and for leaks or flow irregularities; monitoring of power cables for unwanted interference and cable faults; monitoring traffic (roads, railways and trains), The present invention can be applicable to all of these technologies.

The arrangement can be particularly applicable to physical security technologies, including physical layer network security, perimeter security, fence monitoring, and any other type of asset or pathway monitoring.

Advances in these areas have allowed significant sensitivity and intrusion location capabilities. Utilizing technologies such as fiber optic sensors such as modalmetric, polarimetry, and Distributed Acoustic Sensing (DAS), particularly when coupled with machine learning or a management software application, offer significant sensitivity and intelligent alarm parsing for these applications. Practical requirements, as well as government standards, dictate a response to the alarm, which might include inspection or armed forces.

This invention relates to a method of or algorithm for analyzing a monitoring signal from an optical fiber to detect intrusion attempts and other nefarious or intentional disturbances. This is particularly applicable to perimeter security such as at a fence where an optical fiber extends along at least part of the fence and generates changes in a monitor signal transmitted along the fiber in response to any disturbance of the fiber such as movement or vibration caused by an intrusion attempt such as climbing, lifting or cutting. However the method herein can be used in relation to the monitoring of other fibers which can be moved in response to other types of intrusion events. The term disturbance is used herein as this includes both movement and vibration as the difference between these is subtle. The point is that the intention is to detect any disturbance of the fiber which is indicative of an event to be monitored.

It is common for the perimeter wholly or partially enclosing a facility or campus to utilize some sort of security system to detect personnel from entering or exiting the facility. These systems offer a high degree of location discrimination, allowing a security organization to respond to a specific location. That response might include cameras, spotlights, or personnel.

One example of a monitoring system of this type is known as Distributed Acoustic Sensing (DAS) where vibrations and displacements cause localized shifts in the path length of the optical fiber. This is detected by a high precision optical Time Domain Reflectometer (OTDR). This OTDR is often referred to as a Phase-OTDR or ϕ-OTDR, and measures changes in the distance between points of Rayleigh backscatter.

In the DAS system using Rayleigh scatter based distributed fiber optic sensing, a coherent laser pulse is sent along an optic fiber, and scattering sites within the fiber cause the fiber to act as a distributed interferometer.

Gauge length is thus defined as: a sliding window traveling along a fiber will define the region to be measured where this measurement is a window centered on the location measuring the strain between two sections of fiber a gauge length apart. This measurement is defined by the internal calculations of the DAS system and is adjustable by operating upon the interrogator system without change in transmitted or received optical domain parameters. This value of gauge length can be introduced into the software of the interrogator as part of the management of the system and can be varied. In many examples, the gauge length is commonly defaulted to a value equal to the pulse length.

The reflected light is measured as a function of time after transmission of the laser pulse. When the pulse has had time to travel the full length of the fiber and back, the next laser pulse can be sent along the fiber. Changes in the reflected signal of successive pulses from the same region of fiber are caused by changes in the optical path length of that section of fiber. This type of system is very sensitive to both strain and temperature variations of the fiber and measurements can be made almost simultaneously at all sections of the fiber.

The sensitivity and speed of Rayleigh-based sensing allows distributed monitoring of acoustic signals over distances of more than 100 km from each laser source. Typical applications include continuous monitoring of pipelines for unwanted interference and for leaks or flow irregularities; monitoring of power cables for unwanted interference and cable faults; monitoring traffic (roads, railways and trains), borders, and other sensitive perimeters for unusual activity; and even oil well monitoring applications where the technology allows the state of the well all along its length to be determined in real-time. The ability of the optic fiber to operate in harsh environments makes the technology especially well-suited for scenarios in which typical sensing systems are unusable or impractical due to environmental conditions.

This DAS method is used in the Focus products from Network Integrity Systems and uses the method as shown for example in U.S. Pat. No. 9,002,149 (Rogers) assigned to Fotech Solutions Limited.

The Distributed Acoustic Sensor (DAS) connected to one end of the fiber uses a laser to send thousands of short pulses of light along the fiber every second. A small proportion of the light travelling in a fiber is reflected by the process known as Rayleigh Backscatter. Vibrations from the surrounding environment, will disturb the light in the fiber and will therefore be observed by the DAS interrogator.

As the data is processed in real time, advanced algorithms can recognize the unique signatures of each type of event. The events that are of concern are reported to the alarm server.

Using advanced artificial intelligence, machine learning, and other technologies the system differentiates between background noises and real threats. When acoustic events occur along a fiber optic cable, they are detected by the system, which processes all the acoustic data received and applies its detection algorithms to identify and classify events (e.g. digging, climbing, and pipeline leaks). Using artificial intelligence, machine learning, and other technologies on the data received, the system determines if an event is a threat to the integrity of an asset and when to raise the alarm.

In the field of perimeter monitoring with Distributed Acoustic Sensing, it is desirable to use a single monitored fiber to protect a linear asset traversing multiple environments. For example, it would be desirable to monitor a fence installation by installing an optical sensing cable mounted to the fence, then continue that cable by buried installation. This could be to continue the path, or to fold back and monitor the fence by both installation on the fence and buried along the same fence. It is also true of dissimilar fence construction, such as chain link and palisade along a continuous perimeter.

This is also true of other areas of DAS monitoring including data networks and smart cities. For example, a data cable could travel through a building, exit through a wall, and continue to another building. The indoor and outdoor environments would be substantially different from each other, posing issues of setting parameters.

As a part of installation and calibration, the DAS system is adjusted for multiple optical parameters which are fundamentally constant for the entire length of the fiber being monitored. These include optical pulse width, wavelength, optical amplification levels (including Erbium Doped Fiber Amplifiers or EDFA), pulse repetition rate, A/D top of scale level for digitizing circuitry, and others. As these are fundamental to the entire optical transmission of test signal, they cannot be adjusted for optimization along concatenated or continuous fibers, only for the complete continuous fiber.

The term continuous fiber used herein does not require that the fiber form one unitary path but spliced connections are possible with the intention that the signals pass along the full length and act to monitor events along the full length.

SUMMARY OF THE INVENTION

In accordance with the invention there is provided a method for monitoring security of an asset for events which are potentially damaging or threatening to the asset, the method comprising:
  installing an optical fiber continuously through the asset to be monitored;
  the asset having at least two different zones of different physical condition, environment and/or of different risk factors where the optical fiber passes through said different zones to define different portions of the optical fiber each associated with a respective one of the zones;
  using a distributed acoustic sensing (DAS) interrogator to send signals into and receive data signals from the continuous optical fiber;
  effecting an analysis of the received data signals to determine the presence of an event in one or more of the zones;
  the analysis including gauge length parameters applied to the received data signals;
  and applying different gauge length parameters to received data signals from the different zones at the same time.

Preferably the received data signals from the different zones are analyzed with separate, optimized gauge length parameters.

In one arrangement, the selection and assignment of the gauge length parameters are determined by an operator. Alternatively the selection and assignment of the gauge length parameters can be determined automatically by the DAS interrogator.

In a preferred improved method at least one portion is analyzed multiple times with different gauge length parameters. The multiple analyses can be concurrent or can be applied in a selected or random order In some cases the selection and assignment of the gauge length parameters can be determined and adjusted dynamically in response to environmental or ambient conditions applied to the optical fiber in the different zones.

Alternatively the selection and assignment of the gauge length parameters can be provided from a library of presets.

Typically the analysis includes an algorithm applied to the received data signals and the selection and assignment of the gauge length parameters is effected using data determined by the algorithm. That is it is desirable to adjust parameters for individual sections of the sensor fiber. One parameter that is a function of processing rather than bound by optical constants is gauge length. This is derived by calculation after the signal is digitized from the optical input of the DAS systems and as such can be changed for different data sets.

Preferably the gauge length is adjusted to enhance sensitivity and to optimize signal-to-noise ratio within the predefined limit of the DAS interrogator.

It is common in the industry to adjust gauge length based upon the environment of the sensor as well as the resolution required. In typical applications, a linear sensor, such as an optical cable, will traverse consistent environments such as a continuous fence type or buried in consistent regional soil types. When multiple conditions are required, it is common to utilize multiple sensor systems, each optimized for the environment.

This invention utilizes the ability to assert gauge length calculations on the data after it is received. In this manner, different sections of sensor fiber can be assigned different gauge lengths for analysis. For example, in the arrangement of a perimeter monitoring system the fiber may be passed along a fence and then buried adjacent the fence. In this arrangement the fence portion might be analyzed with a long gauge length, dropping noise and trading stability for pinpoint resolution. Once transitioning to buried fiber, the DAS system can be operated to shorten the gauge length as it is a quiet environment, and finer resolution allows post processing that is useful in buried perimeter applications. These post processing functions might include analysis of the bidirectional propagation of the signal as a tool to differentiate footsteps and road noise, or to analyze the footsteps to determine parameters about the origin such as walking gate length.

In some cases the asset can have different zones, where different arrangements of installation of the optical fiber in relation to the asset is expected to generate different responses to events, and the zones are selected in response to the different arrangements of installation. In this way the manner of installation of the fiber relative to different locations or portions of the installation indicates to the installer that these different zones are likely to generate different responses due to the different manner of installation. This enables the installer to select different gauge lengths in the different zones.

In other cases, the asset can pass through different environments, which are expected to generate different responses to events. That is the asset such as a well bore or pipe line may itself be constant in construction and use but passes through different environmental conditions such as changes in soil or ground conditions or changes in moisture or water levels which are again create different responses to events. In this case the zones can be selected in response to the different environments.

In yet another case, the asset may itself be continuous and unvarying along its length but passes through different zones of different risk factor. That is different portions of the asset may require to be monitored to a higher level of assessment because certain portions are more valuable or more likely to be attacked or more likely to be damaged. In this case again the zones can be selected in response to the different risk factors.

In a particularly important embodiment herein the asset is monitored by a perimeter monitoring system having different zones using different installations of the optical fiber in the zones. Thus for example the different installations include different enclosure or fence types, entrance locations where the fiber is located on the fence or enclosure at a location above ground where the fiber is exposed to environmental conditions or the fiber can be located below the ground which necessarily a quieter location.

In this embodiment, where the fiber is passed along a fence in a first zone and then buried in the ground in a second zone, the first zone can be analyzed with a longer gauge length and the buried portion can be analyzed with a shorter gauge length as it is a quiet environment. Thus the shorter gauge length provides finer resolution allows post processing that is useful in buried perimeter applications such as analysis of the bidirectional propagation of the signal as a tool to differentiate footsteps and road noise, or to analyze the footsteps to determine parameters about the origin such as walking gate length.

By adjusting gauge length, the optical measurement will impact the following areas:

Impact of gauge length on Signal to Noise Ratio (SNR). Longer gauge lengths offer improved performance over longer lengths;

Impact of gauge length on sensing range; that is, the max length of fiber which can be monitored;

Impact of gauge length on spectral density;

Impact of gauge length on special resolution that is, the ability to discriminate multiple events which are very close to each other.

DETAILED DESCRIPTION

Figure 1:
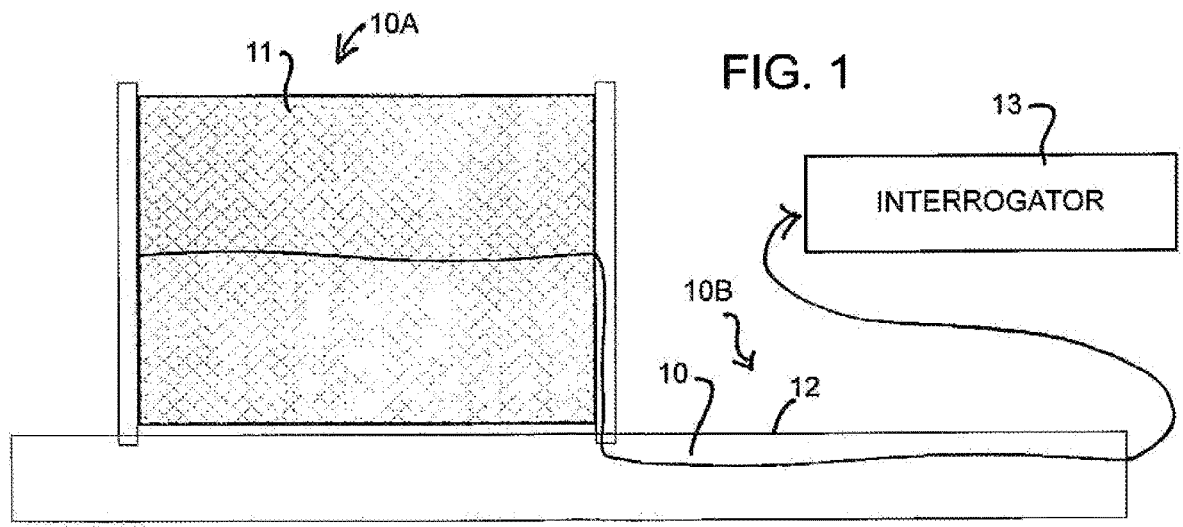
FIGS. 1, 2 and 3 show different locations of the portions of a continuous optical fiber connected to a DAS interrogator

In FIG. 1 is shown an optical fiber 10 which is installed in a perimeter monitoring system where the perimeter includes in a first zone 10A a fence 11 mounted above the ground 12 as shown. In a second zone 10B there is an open space and the same continuous fiber is installed below ground in the second zone. A DAS interrogator 13 of known type is connected at the end of the fiber and is used to send signals into and receive data signals from the continuous optical fiber. The interrogator then effects an analysis of the received data signals to determine the presence of an event in one or more of the zones. As described above the analysis includes applying gauge length parameters to the received data signals and applying different gauge length parameters to received data signals from the different zones at the same time.

Figure 2:
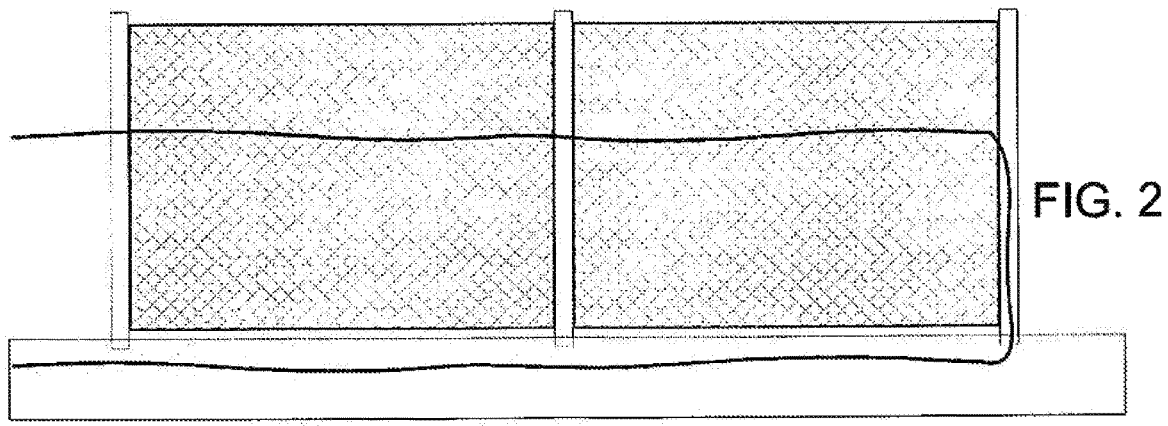

In FIG. 2 the fiber passes through two fence panels forming a first zone and then is returned underground along the same fence to provide a second zone for secondary monitoring.

Figure 3:
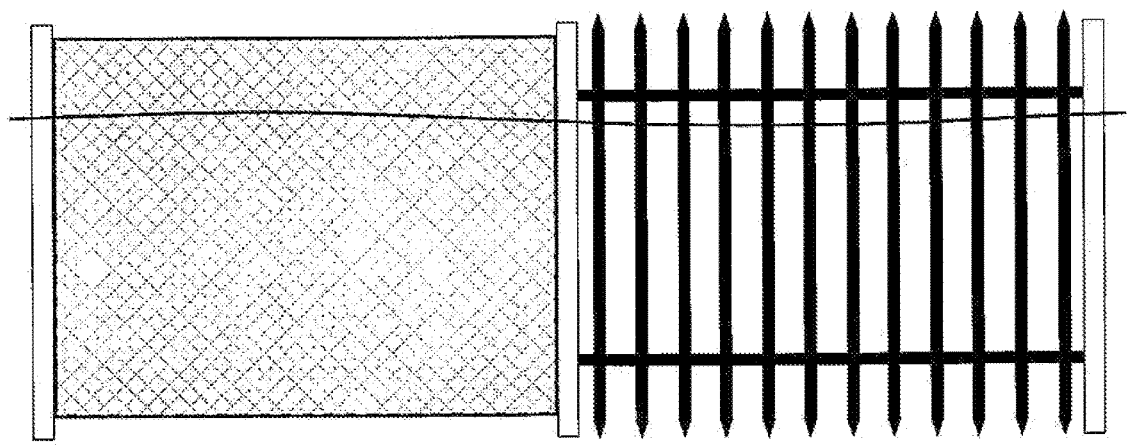

In FIG. 3 the fiber passes through two zones of different fence types.

Figure 4:
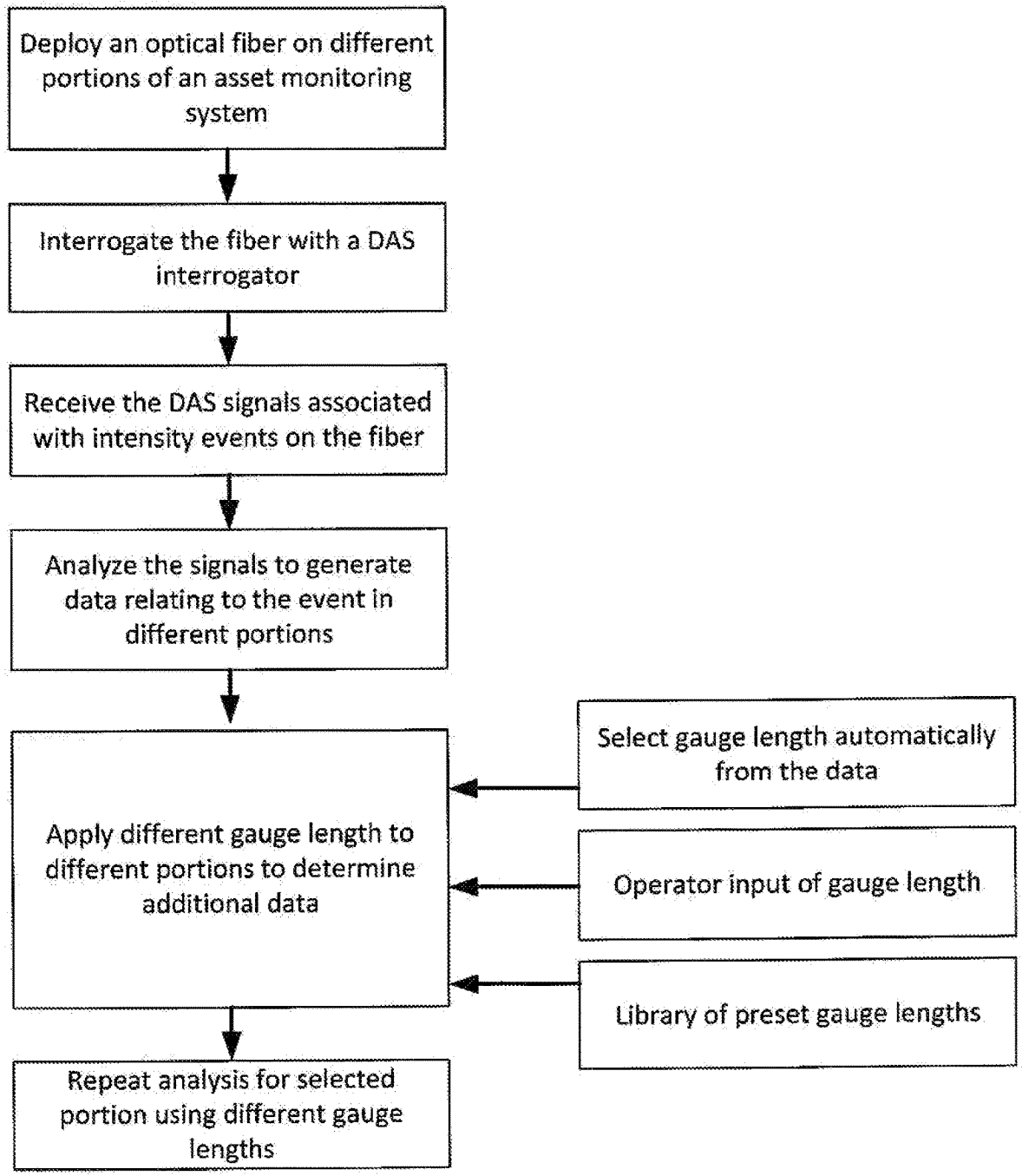
FIG. 4 is a flow chart of a process to select different gauge lengths for different portions of an optical fiber using a DAS interrogator, in accordance with embodiments of the present disclosure.

One embodiment of the method herein is shown in the flow chart of FIG. 4 which includes the following steps:
- Deploy an optical fiber on different portions of an asset monitoring system
- Deploy an optical fiber on different portions of an asset monitoring system
- Receive the DAS signals associated with intensity events on the fiber
- Analyze the signals to generate data relating to the event in different portions
- Apply different gauge length to different portions to determine additional data by one or more of the following:
  - Select gauge length automatically from the data
  - Operator input of gauge length
  - Library of preset gauge lengths
- Repeat analysis for selected portion using different gauge lengths

The invention claimed is:

1. A method for monitoring security of an asset for events which are potentially damaging or threatening to the asset, the method comprising:

Installing a continuous optical fiber continuously through the asset to be monitored;

the asset having at least first and second zones of different physical condition, environment and/or of different risk factors where the continuous optical fiber passes through said first and second zones to define different portions of the continuous optical fiber each associated with a respective one of the first and second zones;

using a distributed acoustic sensing (DAS) interrogator to send signals into and receive data signals from the continuous optical fiber;

effecting an analysis of the received data signals to determine the presence of an event in one or more of the first and second zones;

the analysis including assigning to the continuous optical fiber a series of sequential sliding windows where each sliding window has an associated gauge length parameter assigned thereto and analyzing the signals from each sliding window based on the gauge length assigned thereto;

and selecting for the received data signals at the same time a first gauge length parameter for at least one sliding window in the first zone which is different from a second gauge length parameter for at least one sliding window in the second zone.

2. The method according to claim 1 wherein the selection and assignment of the gauge length parameters of the first and second zones are determined by an operator.

3. The method according to claim 1 wherein the selection and assignment of the gauge length parameters of the first and second zones are determined automatically by the DAS interrogator.

4. The method according to claim 1 wherein at least one portion of the continuous optical fiber is analyzed by multiple analyses with different gauge length parameters.

5. The method according to claim 4 wherein the multiple analyses are concurrent.

6. The method according to claim 4 wherein the multiple analyses are in a selected or random order.

7. The method according to claim 1 wherein the selection and assignment of the gauge length parameters are changed dynamically in response to environmental or ambient conditions applied to the continuous optical fiber in the first and second zones.

8. The method according to claim 1 wherein the selection and assignment of the gauge length parameters are provided from a library of presets of said gauge length parameters.

9. The method according to claim 1 wherein the analysis includes an algorithm applied to the received data signals and wherein the selection and assignment of the gauge length parameters is carried out using data determined by the algorithm.

10. A method for monitoring security of an asset for events which are potentially damaging or threatening to the asset, the method comprising:

installing a continuous optical fiber continuously through the asset to be monitored;

the asset having at least first and second zones where the continuous optical fiber passes through said first and second zones to define different portions of the continuous optical fiber each associated with a respective one of the first and second zones;

wherein the asset is monitored by a perimeter monitoring system having said first and second zones using different installations of the continuous optical fiber in the first zone where the continuous optical fiber is installed on a fence adjacent the asset and in the second zone where the continuous optical fiber is installed in the ground at a location adjacent the asset;

using a distributed acoustic sensing (DAS) interrogator to send signals into and receive data signals from the continuous optical fiber;

effecting an analysis of the received data signals to determine the presence of an event in one or more of the zones;

the analysis including assigning to the continuous optical fiber a series of sequential sliding windows where each sliding window has an associated gauge length parameter assigned thereto and analyzing the signals from each sliding window based on the gauge length assigned thereto;

and selecting for the received data signals at the same time a first gauge length parameter for at least one sliding window in the first zone which is different from a second gauge length parameter for at least one sliding window in the second zone.

11. The method according to claim 10 wherein there is provided a third zone wherein continuous optical fiber is installed on an enclosure or fence type different from that of the first zone.

12. The method according to claim 10 wherein the selection and assignment of the gauge length parameters of the first and second zones are determined by an operator.

13. The method according to claim 10 wherein the selection and assignment of the gauge length parameters of the first and second zones are determined automatically by the DAS interrogator.

14. The method according to claim 10 wherein at least one portion of the continuous optical fiber is analyzed by multiple analyses with different gauge length parameters.

15. A method for monitoring security of an asset for events which are potentially damaging or threatening to the asset, the method comprising:

installing a continuous optical fiber continuously through the asset to be monitored;

the asset having at least first and second zones of different physical condition, environment and/or of different risk factors where the continuous optical fiber passes through said first and second zones to define different portions of the continuous optical fiber each associated with a respective one of the first and second zones;

wherein the asset is monitored by a perimeter monitoring system having said first and second zones using different installations of the continuous optical fiber in the first zone where the continuous optical fiber is installed on a first fence adjacent the asset and in the second zone where the continuous optical fiber is installed on a second fence different from the first fence at a location adjacent the asset;

using a distributed acoustic sensing (DAS) interrogator to send signals into and receive data signals from the continuous optical fiber;

effecting an analysis of the received data signals to determine the presence of an event in one or more of the zones;

the analysis including assigning to the continuous optical fiber a series of sequential sliding windows where each sliding window has an associated gauge length parameter assigned thereto and analyzing the signals from each sliding window based on the gauge length assigned thereto;

selecting for the received data signals at the same time a first gauge length parameter for at least one sliding window in the first zone which is different from a second gauge length parameter for at least one sliding window in the second zone.

16. The method according to claim 15 wherein the selection and assignment of the gauge length parameters of the first and second zones are determined by an operator.

17. The method according to claim 15 wherein the selection and assignment of the gauge length parameters of the first and second zones are determined automatically by the DAS interrogator.

18. The method according to claim 15 wherein at least one portion of the continuous optical fiber is analyzed by multiple analyses with different gauge length parameters.

19. A method for monitoring security of an asset for events which are potentially damaging or threatening to the asset, the method comprising:

installing a continuous optical fiber continuously through the asset to be monitored;

the asset having at least first and second zones of different physical condition, environment and/or of different risk factors where the continuous optical fiber passes through said first and second zones to define different portions of the continuous optical fiber each associated with a respective one of the first and second zones;

using a distributed acoustic sensing (DAS) interrogator to send signals into and receive data signals from the continuous optical fiber;

effecting an analysis of the received data signals to determine the presence of an event in one or more of the zones;

the analysis including assigning to the continuous optical fiber a series of sequential sliding windows where each sliding window has an associated gauge length parameter assigned thereto and analyzing the signals from each sliding window based on the gauge length assigned thereto;

selecting for the received data signals at the same time a first gauge length parameter for at least one sliding window in the first zone which is different from a second gauge length parameter for at least one sliding window in the second zone;

and changing at least one of the first and second gauge length parameters in response to changes in environmental or ambient conditions applied to the continuous optical fiber in at least one of the first and second zones.

20. The method according to claim 15 wherein the selection and assignment of the gauge length parameters of the first and second zones are determined by an operator.

21. The method according to claim 15 wherein the selection and assignment of the gauge length parameters of the first and second zones are determined automatically by the DAS interrogator.

22. The method according to claim 15 wherein at least one portion of the continuous optical fiber is analyzed by multiple analyses with different gauge length parameters.

* * * * *